United States Patent
Kanaguchi et al.

(10) Patent No.: US 6,416,107 B1
(45) Date of Patent: Jul. 9, 2002

(54) SEAT-RECEIVING STRUCTURE FOR VEHICLE

(75) Inventors: Yutaka Kanaguchi; Tatsuya Shiono; Kazuhisa Nishimura, all of Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/644,550

(22) Filed: Aug. 24, 2000

(30) Foreign Application Priority Data

Aug. 27, 1999 (JP) ............................................ 11-240863

(51) Int. Cl.[7] ................................................ B60N 2/10
(52) U.S. Cl. ...................... 296/65.09; 297/15; 296/37.3
(58) Field of Search ........................... 296/65.05, 65.09, 296/66, 37.2, 37.3; 297/15, 335

(56) References Cited

U.S. PATENT DOCUMENTS

| | | | |
|---|---|---|---|
| 4,533,169 A | * 8/1985 | Rauthmann et al. | ....... 296/37.2 |
| 4,848,826 A | * 7/1989 | Kuwabara et al. | ....... 296/97.23 |
| 5,269,581 A | * 12/1993 | Odagaki et al. | .............. 296/66 |
| 5,868,451 A | * 2/1999 | Uno et al. | ........... 296/65.05 X |
| 5,890,758 A | * 4/1999 | Pone et al. | ............... 296/66 X |

FOREIGN PATENT DOCUMENTS

| | | | | |
|---|---|---|---|---|
| JP | 2594404 | | 2/1999 | |
| WO | 083003081 | * | 9/1983 | .............. 296/65.09 |

* cited by examiner

Primary Examiner—Dennis H. Pedder
(74) Attorney, Agent, or Firm—Arent Fox Kintner Plotkin & Kahn, PLLC

(57) ABSTRACT

In a seat-receiving structure for a vehicle, seats are mounted on a floor surface within a vehicle room, and are arranged in a forward-rearward direction, and a seat-receiving recess is formed in and extends downwardly from a floor surface disposed rearwardly of the rearmost-row seat, and the rearmost-row seat can be folded in such a manner that a seat back thereof is brought down forwardly to be laid on a seat cushion thereof, and the folded seat can be turned rearwardly about rotation shafts to be received in the seat-receiving recess. The floor surface, in which the seat-receiving recess 11 is formed, is disposed at a level higher than a foot-resting floor surface 3c for the rearmost-row seat. The rotation shafts 26 on the seat cushion 10a of the rearmost-row seat 10 are disposed at a level which is lower than the floor surface 3f, in which the seat-receiving recess 11 is formed, and also is lower than an upper side 11a of the receiving recess.

11 Claims, 7 Drawing Sheets

SEAT-RECEIVING STRUCTURE FOR VEHICLE

BACKGROUND OF THE INVENTION

1. Field of the Invention

This invention relates to an improved seat-receiving structure for a vehicle suited for a wagon-type vehicle.

2. Description of the Related Art

In wagon-type vehicles (or automobiles), a third-row seat, serving as a rearmost-row seat, is provided rearwardly of a second-row seat, has been put into practical use.

In such a vehicle, when the rearmost-row seat is not used, this seat is often folded down, and the space of this rearmost-row seat is used as a cargo space.

The rearmost-row seat is thus folded down so that this space can be used as a cargo space, and at this time, if part of the folded seat projects upwardly from the floor surface, a cargo can not be neatly put on the folded seat.

In view of the above problem, the Applicant of the present application has earlier proposed Japanese Utility Model Registration No. 2,594,404.

In this technique, a rearmost floor surface is provided rearwardly of a rearmost-row seat, and is disposed at the same level as that of a foot-resting floor surface for the rearmost-row seat. A seat-receiving recess is formed in the rearmost floor surface, and rotation shafts of a rearmost-row seat cushion are provided in the vicinity of a front edge of the receiving recess, and are disposed at the same level as that of an open top (upper end surface) of the receiving recess.

In the above conventional technique, the seat-receiving recess is formed in and extends downwardly from the rearmost floor surface disposed at the same level as that of the floor on which the rearmost-row seat is mounted. Therefore, in view of a minimum ground clearance of the vehicle, it is difficult to form the seat-receiving recess into a large depth, and this seat-receiving recess is not best suited for receiving the seat, having the thick seat cushion and seat back, and there is still room for improvement of it.

The rotation shafts, and brackets supporting these rotation shafts, are disposed at the same level as that of the floor surface, and are disposed at the open top of the receiving recess. Therefore, when the seat is folded, and is tilted down rearwardly through the rotation shafts to be stored or received in the seat receiving recess, there is a possibility that the rotation shafts and the brackets project slightly from the rearmost floor surface. In this case, it is difficult to secure the completely-flat cargo-placing surface after the seat is thus stored.

SUMMARY OF THE INVENTION

This invention has been made in order to solve the above problems, and an object of the invention is to provide a seat-receiving structure for a vehicle in which the depth of a seat-receiving recess can be increased without increasing the height of the vehicle, while keeping a minimum ground clearance to a predetermined level, and the capacity of the seat-receiving recess in a direction of the height thereof can be increased, and the seat-receiving recess serves also as a spare tire-receiving portion, and a cargo-placing floor surface, available when the seat is stored in the seat-receiving recess, is flat.

According to the invention, there is provided a seat-receiving structure for a vehicle wherein seats are mounted on a floor surface within a vehicle room, and are arranged in a forward-rearward direction, and a seat-receiving recess is formed in and extends downwardly from a floor surface disposed rearwardly of the rearmost-row seat, and the rearmost-row seat can be folded in such a manner that a seat back thereof is tilted down forwardly to be laid on a seat cushion thereof, and the folded seat can be turned rearwardly about rotation shafts to be stored in the seat-receiving recess, wherein the floor surface, in which the seat-receiving recess is formed, is disposed at a level higher than a foot-resting floor surface for the rearmost-row seat; and the rotation shafts on the seat cushion of the rearmost-row seat are disposed at a level which is lower than the floor surface, in which the seat-receiving recess is formed, and also is lower than an upper side of the receiving recess.

In this construction, the floor surface, in which the seat-receiving recess is formed, is disposed at a level higher than the foot-resting floor surface for the rearmost-row seat, and therefore the depth of the seat-receiving recess can be made large. Therefore, the size and thickness of the rearmost-row seat can be increased, and there can be provided the rearmost-row seat on which the passenger(s) can be seated comfortably though it is of the foldable, storable type.

It is only necessary that the floor surface, in which the seat-receiving recess is formed, should be disposed at the level higher than the foot-resting floor surface for the rearmost-row seat, and therefore the height of the vehicle will not increase, and besides a predetermined ground clearance can be secured while increasing the depth of the seat-receiving recess.

The rotation shafts on the seat cushion of the rearmost-row seat are disposed at a level which is lower than the floor surface, in which the seat-receiving recess is formed, and also is lower than the upper side of the receiving recess. Therefore, when the seat is stored, there can be obtained the completely-flat cargo-placing floor surface having no projection.

In the invention, an upper half portion of the seat-receiving recess serves as a receiving portion for receiving the rearmost-row seat while a lower half portion of the receiving recess serves as a receiving portion for receiving a spare tire.

In this construction, the seat and the spare tire can be stored in a stacked manner in the receiving recess without increasing the vehicle height while securing the minimum ground clearance.

In the invention, right and left frames are provided below a floor of a vehicle, and are disposed at right and left side portions of the floor, respectively, and rear end portions of the right and left frames are offset outwardly in a direction of a width of the vehicle to provide wide portions, respectively, and the seat-receiving recess is provided at a space between the wide portions.

In this construction, the seat-receiving recess is provided between the wide portions (rear end portions) of the right and left frames, and therefore the width of the receiving recess can be increased while securing the increased depth thereof, so that the capacity of the seat-receiving recess can be increased.

DETAILED DESCRIPTION OF THE PREFERRED EMBODIMENTS

A preferred embodiment of the present invention will now be described with reference to the accompanying drawings. The drawings should be viewed in the direction of reference signs.

Figure 1:
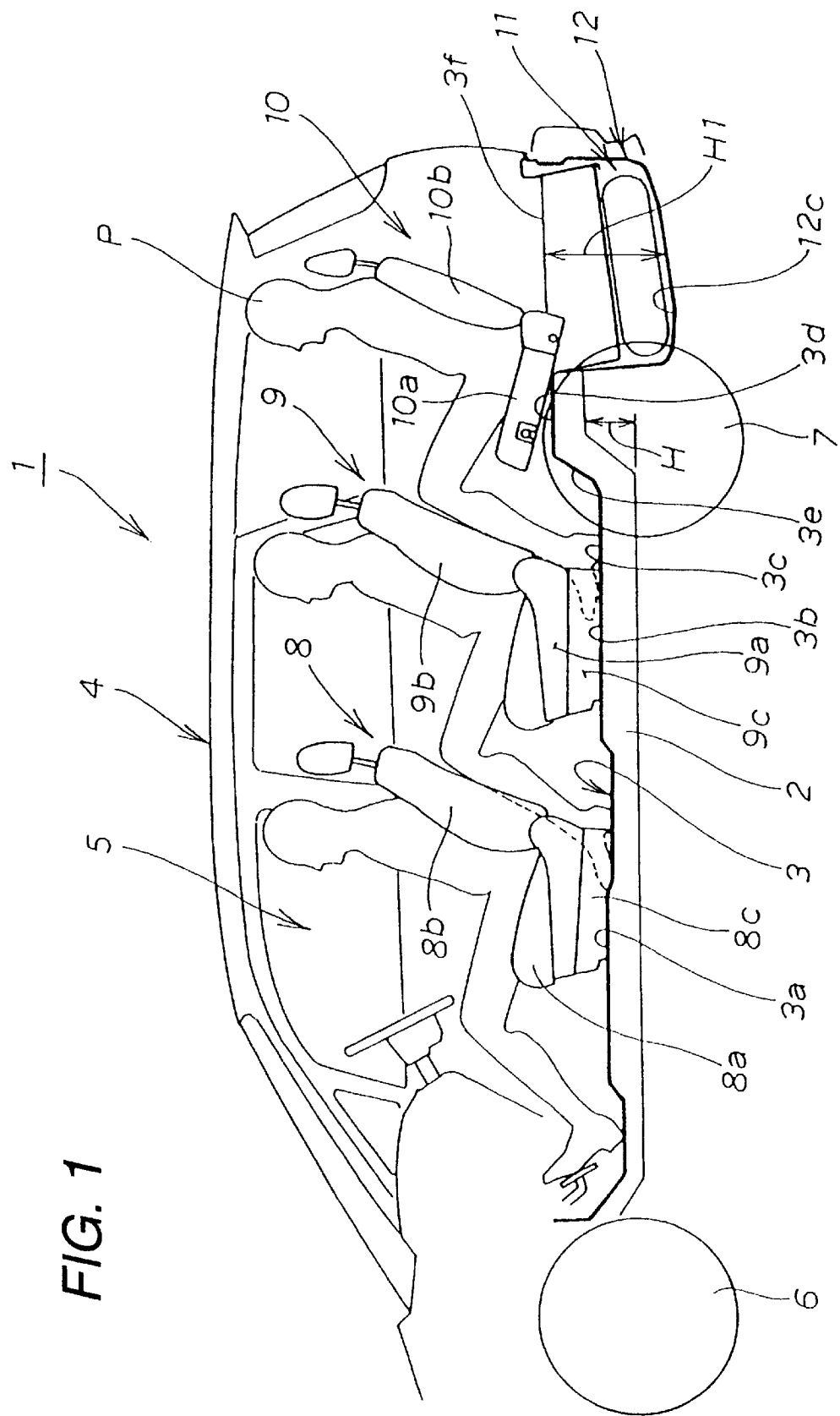
FIG. 1 is a schematic, side-elevational view showing one example of a vehicle (automobile) having a seat-receiving structure of the invention.

FIG. 1 is a schematic, side-elevational view showing one example of a vehicle (automobile) having a seat-receiving structure of the invention.

In the drawings, reference numeral 1 denotes the wagon-type vehicle, and in the illustrated embodiment, seats are arranged in three rows in a forward-rearward direction, that is, a front-row seat, an intermediate-row seat and a rearmost-row seat are provided. However, the vehicle may have two rows of seats or more than three rows of seats in the forward-rearward direction, and the invention can be carried out in so far as the vehicle is of the type having a door at a rear end thereof.

Right and left side frames 2 (see FIG. 2) extend in the forward-rearward direction of the vehicle, and a floor panel is mounted on these side frames to form a floor surface 3, and a body (shell) 4 is mounted to form a vehicle room 5. An engine (not shown) is mounted on a front portion of the vehicle, and the vehicle has front wheels 6 and rear wheels 7.

The first-row (front-row) seat 8, the second-row (intermediate-row) seat 9 and the third-row (rearmost-row) seat 10 are arranged on the floor surface 3 in this order from the front portion to the rear portion, and are spaced from one another at predetermined intervals. Among these seats 8, 9 and 10, for example, the front-row seat 8 may comprise separate seats, one for the driver and the other for the assistant, and the intermediate-row seat 9 may also comprise separate (right and left) seats so as to provide a passage therebetween to enable the passenger to move or walk through in the vehicle room. The rearmost-row seat 10 is a bench-type seat having right and left seat portions connected together.

The seats 8, 9 and 10 include respective seat cushions 8a, 9a and 10a, and respective reclinable seat backs 8b, 9b and lob. A floor surface 3a, on which the front-row seat 8 is mounted, is disposed generally at the same level as that of a floor surface 3b on which the second-row seat 9 is mounted. An adjusting portion 8c for sliding the seat cushion 8a forward and rearward is provided between the seat cushion 8a and the floor surface 3a, and an adjusting portion 9c for sliding the seat cushion 9a forward and rearward is provided between the seat cushion 9a and the floor surface 3b.

A floor surface 3d (which is a rear portion of the floor surface 3 on which the seats 8, 9 and 10 are mounted), on which the rearmost-row seat 10 is mounted, is disposed at a level a step higher than a foot-resting floor surface 3c on which the feet of the passenger P, seated on the rearmost-row seat 10, are rested. The foot-resting floor surface 3c and the seat-mounting floor surface 3d are interconnected by a connecting portion 3e which is slanting upwardly rearwardly.

In this embodiment, the foot-resting floor surface 3c is at the same level as that of the floor surface 3b on which the intermediate-row seat 9 (provided forwardly of the rearmost-row seat 10) is mounted.

A rearmost floor surface 3f, disposed at the rear side of the floor surface 3d on which the rearmost-row seat 10 is mounted, is at the same level as that of the seat-mounting floor surface 3d. Therefore, the rearmost floor surface 3f extends rearwardly from the rearmost-row seat-mounting floor surface 3d in continuous, coplanar relation thereto.

Figure 3:
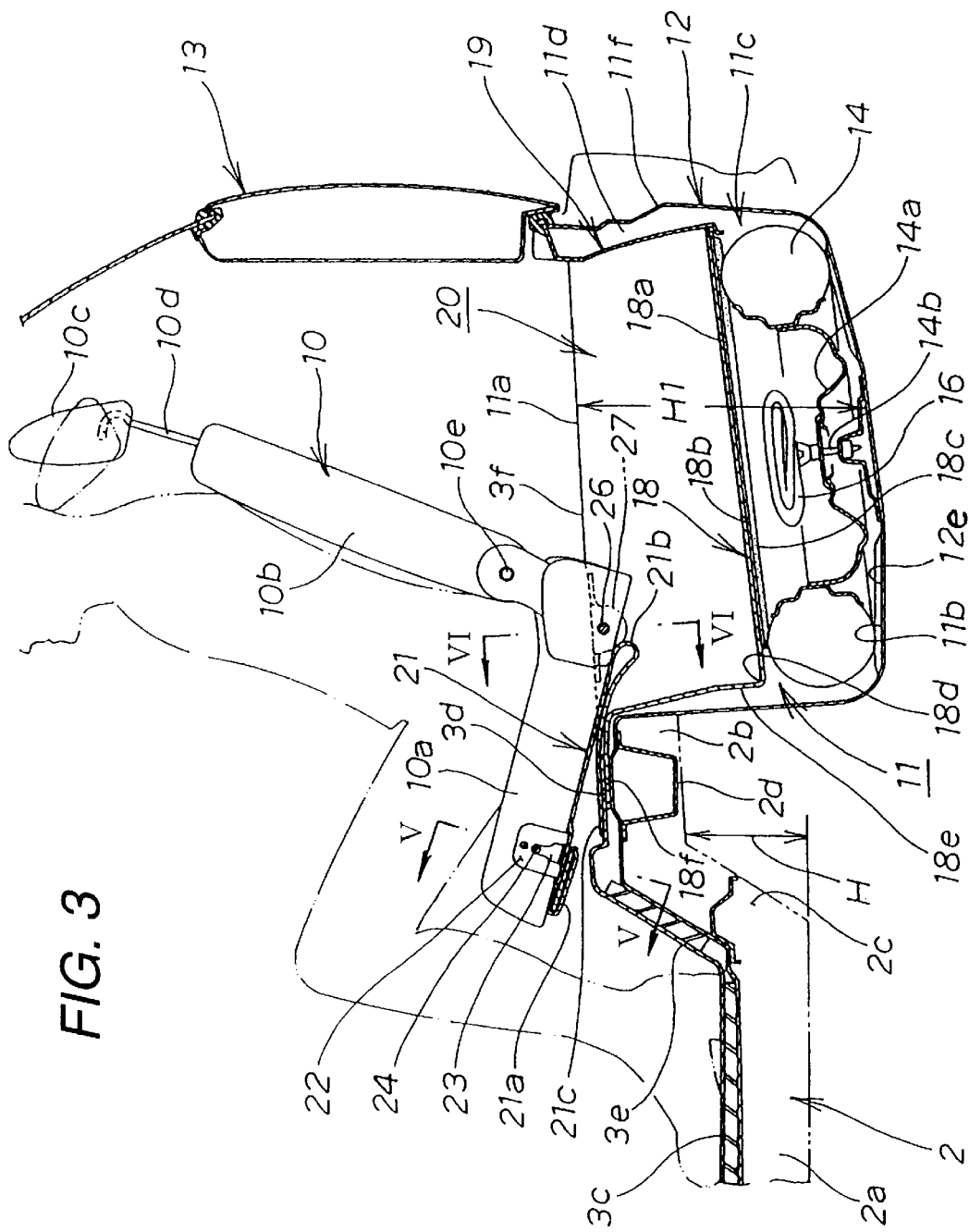
FIG. 3 is a vertical cross-sectional view of a rear portion of the vehicle.
Figure 4:
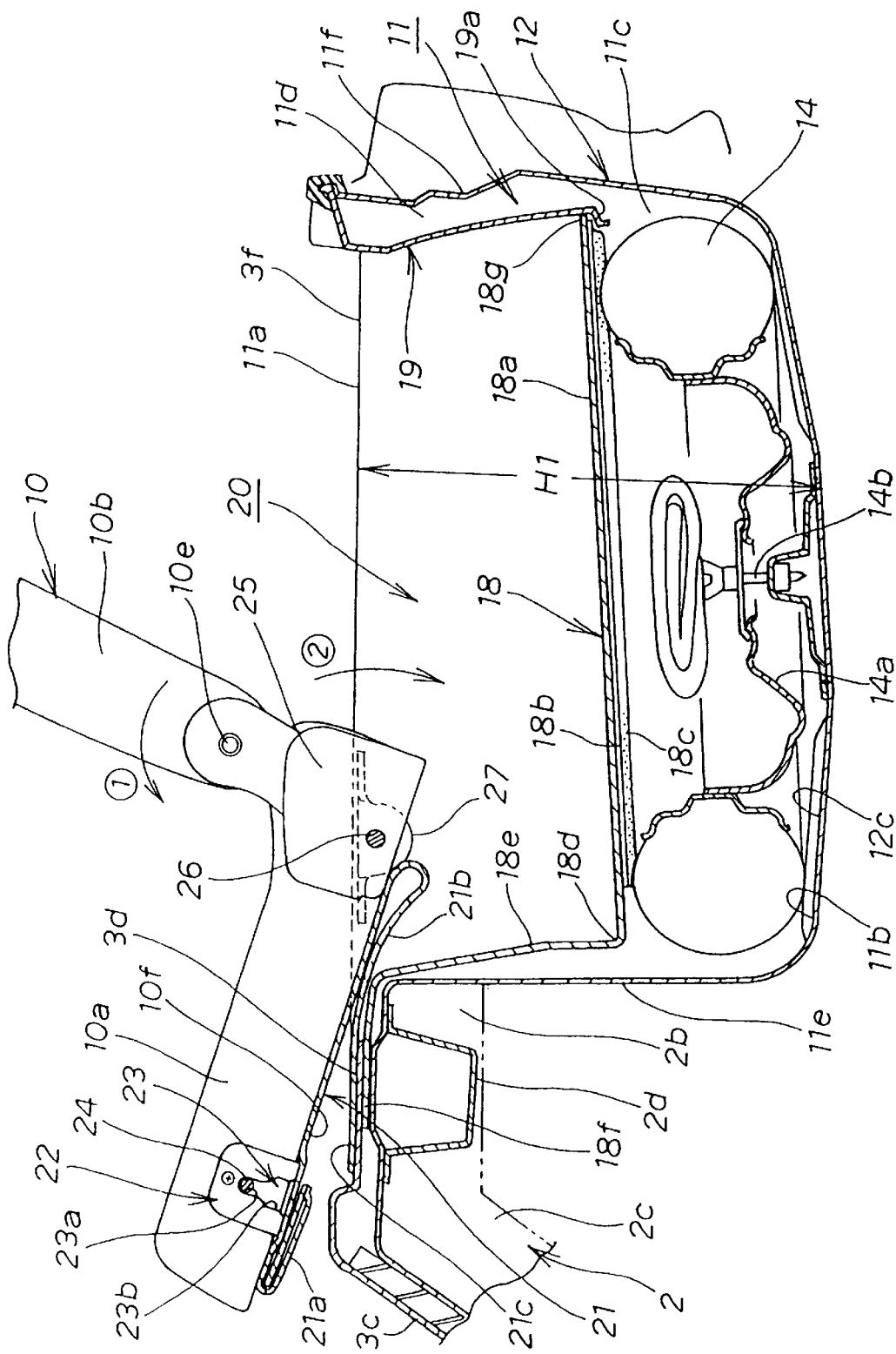
FIG. 4 is an enlarged view of an important portion of FIG. 3.

The rearmost floor surface 3f is disposed generally at the same level as that of an open top (upper end surface) 11a of an upwardly-open seat-receiving recess 11, and therefore, in FIGS. 3 and 4, reference numeral 3f, denoting the rearmost floor surface, is put on the level of the open top 11a.

The seat-receiving recess 11 is formed in the rearmost floor surface 3f disposed at the rear side of the rearmost-row seat 10. The seat-receiving recess 11 is upwardly open to the rearmost floor surface 3f disposed at the same level as that of the floor surface 3d on which the rearmost-row seat 10 is mounted.

Figure 2:
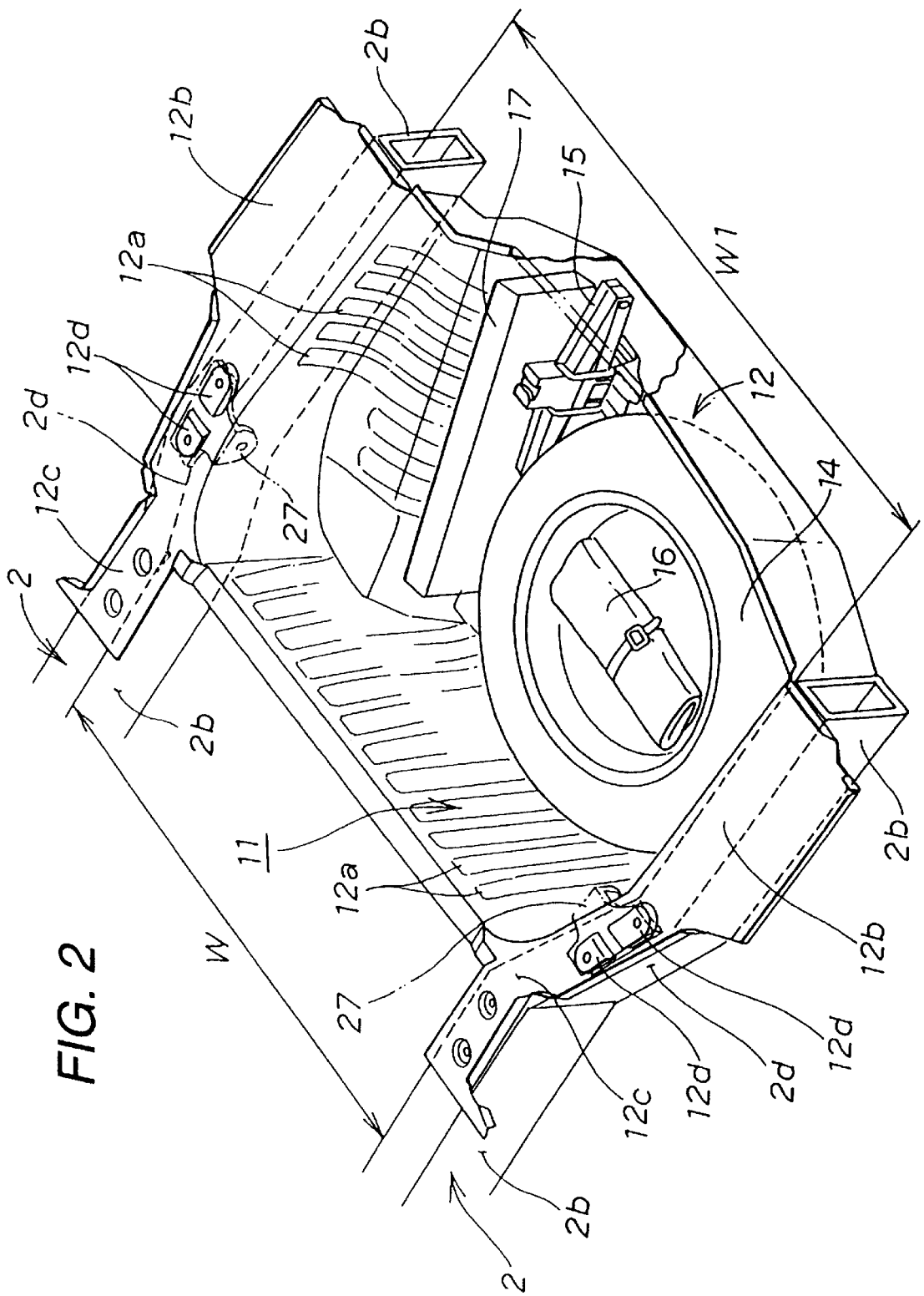
FIG. 2 is a perspective view showing a seat-receiving recess and rear end portions of frames between which this seat-receiving recess is provided.

FIG. 2 is a perspective view showing the seat-receiving recess 11 and rear portions of the frames 2 and 2 at which the seat-receiving recess 11 is provided.

As described above, the right and left side frames 2 and 2 are provided at the lower side of the floor of the vehicle, and extend in the forward-rearward direction. For example, each of the two side frames 2 and 2 is in the form of a pipe having a vertically-elongated, rectangular cross-section. Front-intermediate portions 2a and 2a of the frames 2 and 2, each lying between its front end and a rear end of its intermediate portion, extend rearwardly in parallel relation to each other, and the two front-intermediate portions 2a and 2a are spaced a predetermined distance (width) W from each other. A plurality of cross bars (not shown in FIG. 2) extend between the frames 2 and 2, and are spaced from one another in the forward-rearward direction. The rear cross bar is designated at 2d in FIGS. 3 and 4.

The distance (width) W1 between rear end portions 2b and 2b of the right and left side frames 2 and 2 is larger than the distance (width) W between the front-intermediate portions 2a and 2a, and thus the rear end portions 2b and 2b serve as wide portions, respectively. The width W1 is slightly larger than the width of the rearmost-row seat 10 (i.e., its dimension in the direction of the width of the vehicle), and the seat-receiving recess 11, capable of receiving or receiving the rearmost-row seat 10, is formed between the rear end portions 2b and 2b.

The rear end portion 2b of each of the right and left side frames 2 and 2 is slightly larger than the dimension of the rearmost-row seat 10 in the forward-rearward direction. Each of the side frame 2 has a slanting portion 2d between the rear end portion 2b, and the two slanting portions 2d and 2d diverge gradually rearwardly when viewed from the top.

As shown in FIG. 1, inclined portions 2c and 2c extend and incline upwardly rearwardly from the rear ends of the front-intermediate portions 2a and 2a of the right and left side frames 2 and 2, respectively, and the rear end portions 2b and 2b of the right and left side frames 2 and 2 extend rearwardly a predetermined distance from the rear ends (upper ends) of the inclined portions 2c and 2c, respectively. Therefore, the rear end portions 2b and 2b are disposed at a level which is higher a predetermined amount H than the front-intermediate portions 2a and 2a.

Therefore, with respect to the floor surface 3 disposed on the side frames 2 and 2, the floor surface 3d, on which the rearmost-row seat 10 is mounted, and the floor surface 3f, extending rearwardly from the floor surface 3d, are disposed at a level a step higher than the foot-resting floor 3c, and the connecting portion 3e, extending between the inclined portions 2c and 2c, is inclined upwardly rearwardly, as described above for FIG. 1.

The seat-receiving recess 11 is formed between the rear end portions (wide portions) 2b and 2b of the side frames 2 and 2.

In this embodiment, the seat-receiving recess 11 is formed by a deep dish-like member 12 formed by drawing-pressing a steel sheet into a deep dish-like shape. Ribs 12a . . . are formed at a peripheral wall and a bottom wall of this member 12, and by doing so, the rigidity and strength of the member 12 are increased, and the thickness of the steel sheet can be reduced, and further a lightweight design can be achieved. Outwardly-directed, mounting flanges 12b and 12 are formed respectively at upper edges of opposite side walls of the member 12, and are placed on the rear end portions 2b and 2b of the side frames 2 and 2, respectively, and are integrally secured respectively to these rear end portions 2b and 2b by welding or the like. Upper surfaces of the mounting flanges 12b and 12b are disposed at the same level as that of the rearmost-row seat-mounting floor surface 3d, and the seat-receiving recess 11 is upwardly open to the top thereof at which the upper surfaces of the mounting flanges 12b and 12b are disposed.

Extension portions 12c and 12c extend forwardly from the mounting flanges 12b and 12b, respectively, along the slanting portions 2d and 2d, and serve as mounting bases for an equipment.

As shown in FIG. 1, a bottom 12e of the deep dish-like member 12, forming the seat-receiving recess 11, is disposed at level a predetermined amount lower than the bottoms of the side frames 2 and 2. Since the rear end portions 2b and 2b of the side frames 2 and 2 are disposed at the high level, the seat-receiving recess 11 has a large depth H1.

FIG. 3 is a vertical cross-sectional, side-elevational view of the rear portion of the vehicle. FIG. 4 is an enlarged view of an important portion of FIG. 3. FIGS. 3 and 4 both show the same portion though FIG. 3 shows the whole thereof while FIG. 4 shows the important portion thereof, and therefore description will be made with reference to FIGS. 3 and 4.

In FIG. 3, a rear door 13 can be opened and closed through upper hinges (not shown), provided above the rear end of the seat-receiving recess 11, and a cargo can be loaded into the seat-receiving recess 11 to be received therein. Alternatively, a cargo is placed on a flat surface of a cargo space obtained when the rearmost-row seat 10 is tilted down.

It will be readily appreciated from FIGS. 3 and 4 that the depth Hi of the seat-receiving recess 11 can be made large, as described above. The seat-receiving recess 11 and hence the deep dish-like member 12 has the increased overall height. However, the open top 11a is disposed at the high level as described above, and therefore the minimum ground clearance will not decrease.

A spare tire 14 is received in a lower half portion 11c of the seat-receiving recess 11 extending from a bottom 11b thereof to a middle portion thereof in the direction of the height (see FIG. 2). A jack 15, tools 16, a triangular alarm plate for emergency stop purposes and so on are received, together with the spare tire 14, in this lower half portion. The spare tire 14 is removably fastened to the bottom 12e of the deep dish-like member 12 by a fastener member 14b connected to a hub 14a of the spare tire 14. An upper half portion 11d of the seat-receiving recess 11 serves as a seat-receiving portion.

A partition sheet 18 comprises a relatively-thick sheet member having a certain degree of flexibility, and has a generally L-shaped cross-section. A thin, rigid sheet 18b is bonded to a lower surface of a partition plate portion 18a of the partition sheet 18 to be placed on the spare tire 14, and a protective plate 18c, made of rubber, a foamed material or the like, is boned to a lower surface of the thin sheet 18b, thereby preventing the abrasion of the surface of the spare tire 14 underlying the partition sheet 18.

The partition plate portion 18a of the partition plate 18 is generally equal in size (in the widthwise direction and the forward-rearward direction) to the upper half portion 11d of the seat-receiving recess 11. An upwardly-bent hinge portion 18d is formed at a front end of the partition plate portion 18a, and a front wall portion 18e extends upwardly from the hinge portion 18d generally in parallel relation to an inner surface of a front wall 11e of the upper half portion 11d of the seat-receiving recess 11, and a front end portion 18f extends forwardly generally perpendicularly from an upper end of the front wall portion 18e, and the front end portion 18f is fixedly secured to the floor surface 3d (on which the rearmost-row seat 10 is mounted) beneath the seat cushion 10a of the seat 10.

A partition vertical wall member 19 of a rigid nature is provided adjacent to an inner surface of a rear wall 11f of the upper half portion 11d of the seat-receiving portion 11 in opposed relation thereto. A forwardly-bent, shelf-like reception portion 19a is formed at a lower end of the vertical wall member 19. This reception portion 19a is disposed generally at the same level as the upper surface of the spare tire 14, and is disposed exactly or generally on the same position as the rearmost end of the received spare tire 14.

A rear end 18g of the partition plate portion 18a of the partition sheet 18 is engaged with the reception portion 19a, so that the partition plate portion 18a separates the lower half portion 11c, receiving the spare tire 14 from the upper half portion 11d, thereby forming the seat-receiving portion 20 isolated from the spare tire 14 by the partition sheet 18.

As described above, the rearmost-row seat 10 is the bench-type seat, and includes the seat cushion 10a and the seat back 10b. The seat back 10b can be turned (or tilted down forwardly) about support shafts 10e in a direction of arrow ① in FIG. 4 to be laid on the seat cushion 10a. Thus, the rearmost-row seat 10 can be folded down.

As shown in FIG. 3, headrests 10c are provided on an upper end of the seat back 10b through respective stays 10d, and the height of each headrest 10c can be adjusted.

A decorative mat 21 is affixed to a bottom surface 10f of the seat cushion 10a. This mat 21 is provided on the bottom surface 10f except a rear portion thereof. A folded-back, front end piece portion 21a is formed at a front end of the mat 21, and is fastened in position by a flat fastener or the like, and the mat 21 is folded back in a loop-like manner adjacent to the rear portion of the bottom surface 10f to thereby form a long extra portion 21b.

A front half portion of the extra portion 21b is held between the bottom 10f and the seat-mounting floor surface 3d, and a rear half portion thereof is disposed in the front portion of the receiving portion 20. A distal end portion 21c of the extra portion 21b is fastened onto the mounting floor surface 3d.

Fixing metal members 22 are mounted on the opposite sides of the seat cushion 10a, respectively, and each fixing metal member 22 has a retaining groove 23, and an upper half portion of this retaining groove 23 is narrow while a lower half portion thereof is wider, and is open downwardly. On the other hand, retaining pins 24 are provided on the vehicle body.

Figure 5:
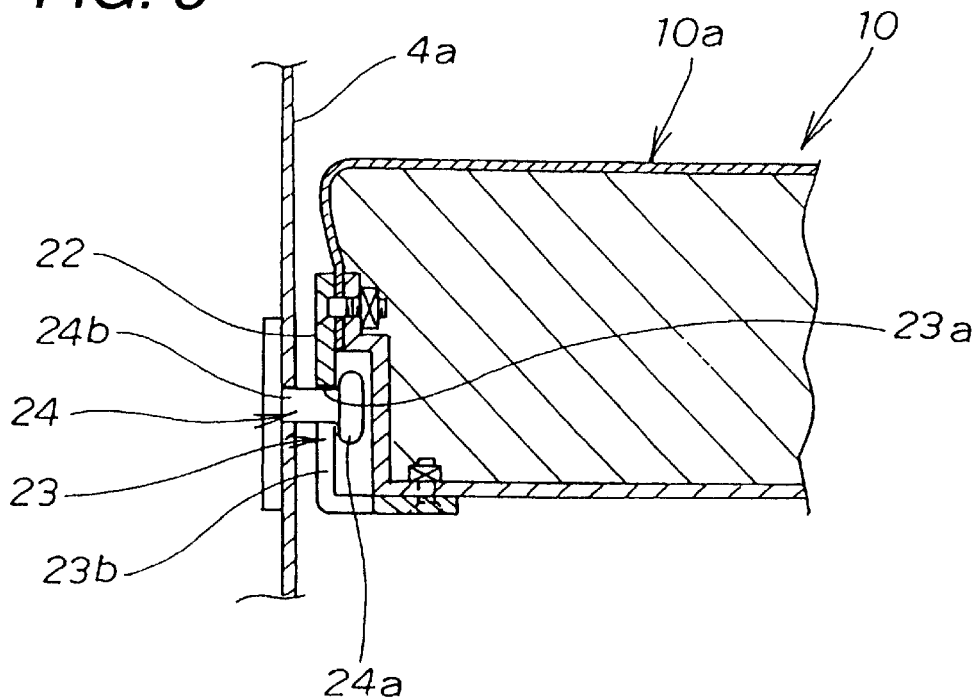
FIG. 5 is an enlarged, cross-sectional view taken along the line V—V of FIG. 3.

FIG. 5 is an enlarged cross-sectional view taken along the line V—V of FIG. 3. The relation between the fixing metal member 22 and the retaining pin 24 will be described in detail with reference to FIGS. 3, 4 and 5.

The retaining pins 24 are formed on and project respectively from inner surfaces of inner plates (opposite side plates) 4a of the body 4 facing the vehicle room, each of the retaining pins 24 having an enlarged portion 24a formed at a distal end thereof. The enlarged portion 24a is smaller than the wider, lower half portion 23b of the retaining groove 23, but is larger than the narrower, upper half portion 23a, and a shank portion 24b of the retaining pin 24 is fitted in the narrower, upper half portion 23a.

When the passenger is seated on the seat as shown in FIGS. 3 and 4, the load of the passenger acts on the seat cushion 10a, and the shank portion 24b of each retaining pin 24 is abutted against an upper edge of the upper half portion 23a of the retaining groove 23, thereby limiting the seat 10 from further tilting downwardly from the upwardly-slanting posture (shown in the drawings), thus holding this posture.

The rear portions of the opposite side surfaces of the seat cushion 10a of the rearmost-row seat 10 are supported respectively on the opposite inner surfaces of the seat-receiving recess 11 by rotation shafts 26.

Figure 6:
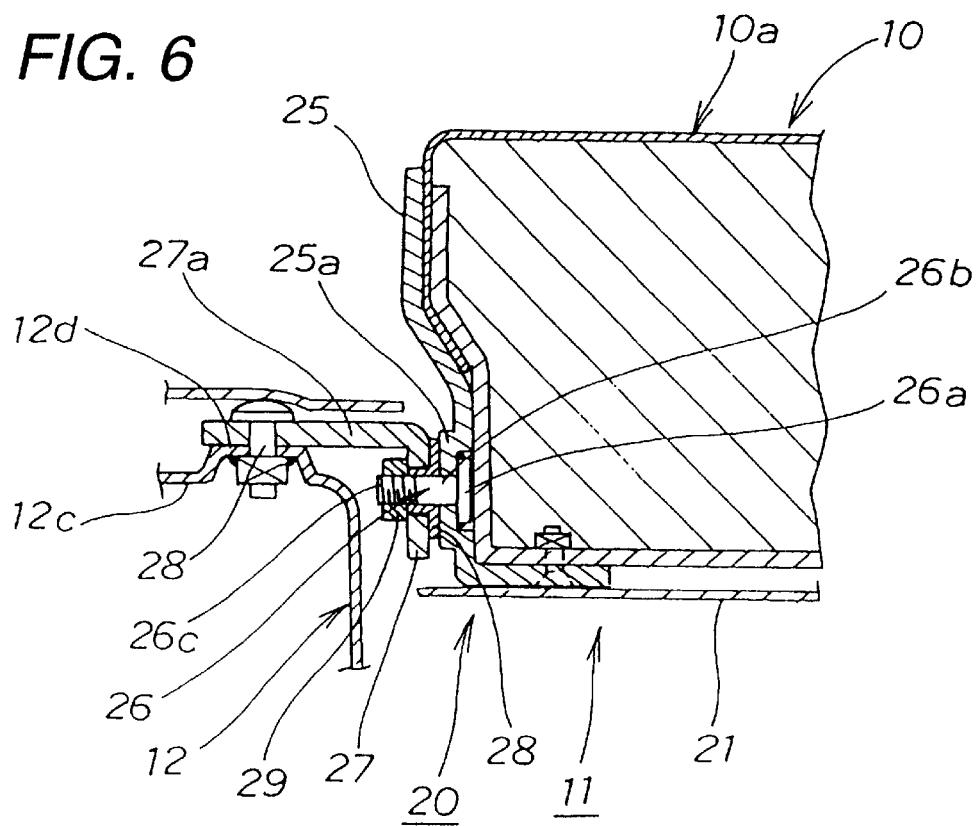
FIG. 6 is an enlarged, cross-sectional view taken along the line VI—VI of FIG. 3.

FIG. 6 is an enlarged cross-sectional view taken along the line VI—VI of FIG. 3. The relation between the rotation shafts, the seat cushion and the seat-receiving portion will be described in detail with reference to FIGS. 3 and 4.

Cover-like holders 25 are mounted respectively on the opposite sides of the rear end portion of the seat cushion 10a. A head 26a of each rotation shaft 26 is held on a lower portion of the holder 25 through an outwardly-stepped portion 25a, and a stem portion 26b of the rotation shaft 26 projects outwardly from the outwardly-stepped portion 25a.

Semi-circular brackets 27 are provided respectively at the opposite inner surfaces of the front portion of the seat-receiving recess 11 in opposed relation to each other.

As best shown in FIGS. 3 and 4, each bracket 27 is disposed at a level slightly below the open top 11a of the seat-receiving recess 11, and the stem portion 26b of each rotation shaft 26 is passed through the bracket 27, and a nut 29 is threaded on a screw portion 26c of the stem portion 26b at the outer side of the bracket 27, thereby securing the stem portion 26b to the bracket 27. In FIG. 6, reference numeral 28 denotes a collar with a flange.

As a result, the seat cushion 10a can be turned rearwardly in a direction of arrow ② (FIGS. 3 and 4) about the rotation shafts 26.

As best shown in FIGS. 3 and 4, the rotation shafts 26 are disposed at a level below the floor surface 3d on which the seat cushion 10a of the rearmost-row seat 10 is mounted, and hence is disposed at the level below the open top 11a of the seat-receiving recess 11 which is disposed generally at the same level as the floor surface 3d.

Therefore, the rear end portion of the forwardly upwardly-slanting seat cushion 10a, including a lower half portion of the rear portion of each holder 25, is disposed in the upper portion of the front portion of the seat-receiving recess 11 (and hence in the upper portion of the front portion of the seat-receiving portion 20) in a rearwardly downwardly-slanting manner.

As shown in FIG. 6, each of the brackets 27 has an inverted L-shape when viewed from the front side, and as described above, the brackets 27 fixedly support the rotation shafts 26, respectively, and outwardly-bent base portions 27a of the two brackets 27 are fixedly secured by screws 28 to bosses 12d formed respectively on the extension portions 12c extending respectively from the upper ends of the opposite side walls of the deep dish-shaped member 12 forming the seat-receiving recess 11.

Next, the used condition and received condition of the rearmost-row seat 10 will be described.

FIGS. 1, 3 and 4 show the used condition of the rearmost-row seat 10. As described above, the seat cushion 10a is mounted on the seat-mounting floor surface 3d in such a forwardly upwardly-slanting manner that the front portion thereof is directed upwardly whereas the rear portion thereof is directed downwardly. The load of the passenger is supported by the support shafts 24, provided at the front portion of the seat 10, and the rotation shafts 26 provided at the rear end portion of the seat 10.

The rear door 13, shown in FIG. 3, is opened, and then a cargo can be loaded into the large, pocket-like seat-receiving portion 20 (provided at the rear side of the seat 10) having the open side (open top) disposed at a level which is higher than the foot-resting floor surface 3c, and is equal to the seat-mounting floor surface 3d. At this time, the receiving portion 20 is separated from the spare tire 14 by the partition sheet 18, and the partition plate portion 18a forms the flat bottom, and this is advantageous when loading and receiving a cargo.

Figure 7:
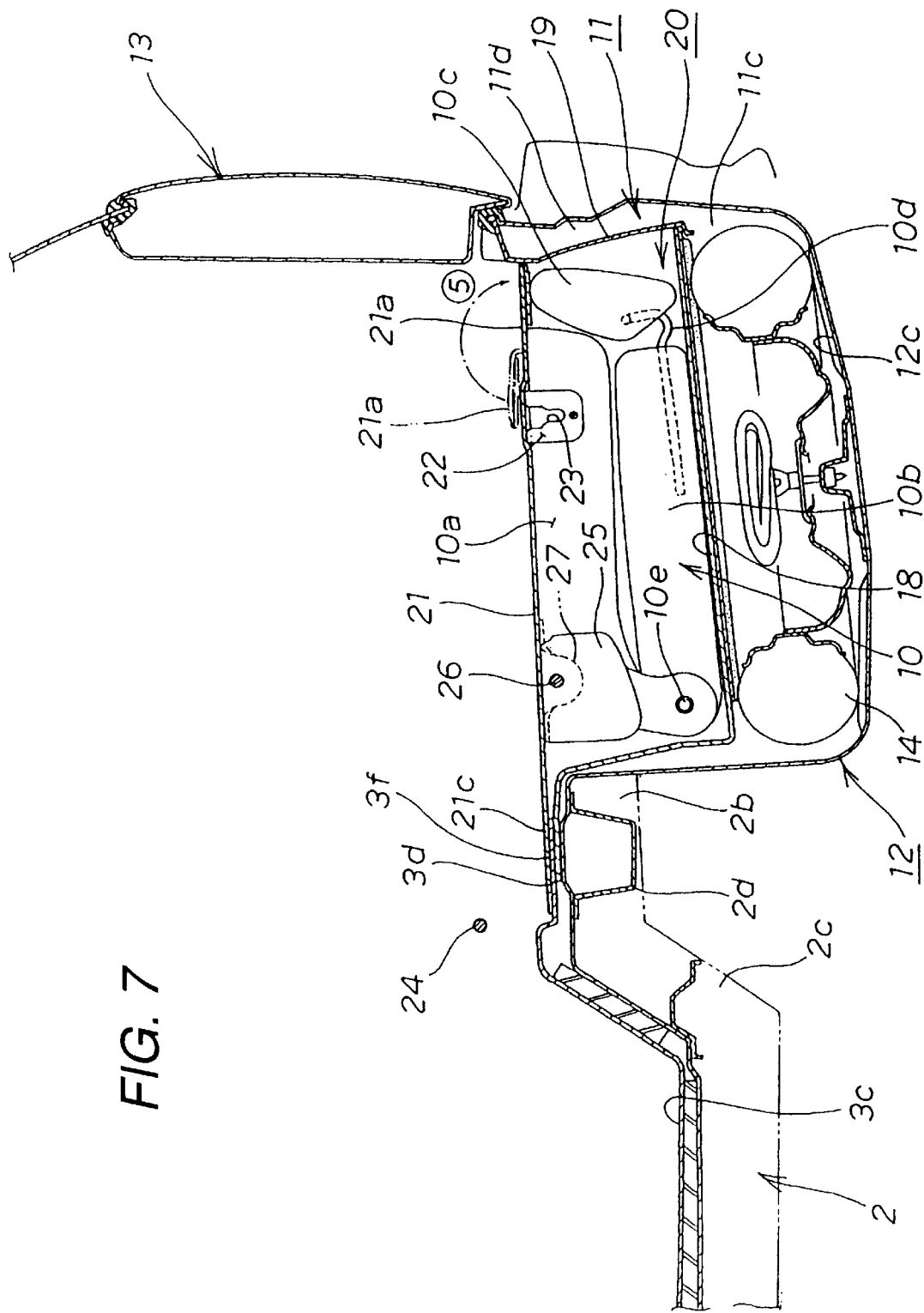
FIG. 7 is a vertical cross-sectional view similar to FIG. 3 but showing a condition in which a rearmost-row seat is received in a seat-receiving portion of the seat-receiving recess.

FIG. 7 is a vertical cross-sectional view similar to FIG. 3, but showing a condition in which the rearmost-row seat 10 is received in the seat-receiving portion 20 of the seat-receiving recess 11.

As described above with reference to FIG. 4, the seat back 10b is turned forwardly about the support shafts 10e to be laid on the seat cushion 10a.

Before this operation, the headrests 10c are tilted forwardly as indicated in phantom in FIG. 3, and are moved downward through the respective stays 10d, thus beforehand decreasing the height.

In this condition, the seat cushion 10a is turned rearwardly about the rotation shafts 26, provided at the rear end portion thereof, in an inverted manner.

The retaining pins 24, respectively holding the opposite sides of the seat cushion 10a against movement, are disengaged respectively from the fixing metal members 22 since the lower half portion 23b of each retaining groove 23 is wide and open downwardly.

Thus, the engagement of the fixing metal members 22 with the retaining pins 24 is canceled, and the seat 10 is turned rearwardly about the rotation shafts 26.

As a result, the rear side of the seat back 10b rests on the partition plate portion 18a of the partition sheet 18, provided in the receiving portion 20, in parallel relation thereto, and the seat cushion 10a is superposed on the seat back 10b in parallel relation thereto, and is received in the receiving portion 20.

As described above, the rotation shafts 26 are disposed at a level lower than the open top 11a (upper end surface) of the seat-receiving recess 11, and therefore the bottom surface 10f of the seat cushion 10a can be disposed at the same level as that of the open top 11a of the seat-receiving recess 11, and the rotation shafts 26 and the brackets 27 will not project upwardly beyond the open top 11a.

As described above, the decorative mat 21 is affixed to the bottom surface 10f of the seat cushion 10a, and the distal end portion 21c of the mat 21 is affixed to the mounting floor surface 3d.

The extra portion 21b is expanded to cover the rear portion of the bottom surface 10f of the seat cushion 10a, and the folded-back front end piece portion 21a, by resolving its secured condition by a flat fastener or the like as indicated in phantom in FIG. 7, is expanded to the front end of the seat cushion 10a.

A plate-like core member can be embedded in the folded-back front end piece portion 21a, and by doing so, the expansion of this portion 21a, as well as the covering by this portion 21a, can be positively effected.

As a result of the above operation, the upper side of the receiving portion 20, in which the bottom surface 10f of the seat cushion 10a, defining the upper surface of the received seat 10, lies, is entirely covered with the decorative mat 21.

This condition is shown in FIG. 7. As will be appreciated from this, the cargo space, having the flat surface having no projection, is formed over an area including the rearmost-row seat-mounting floor surface and the seat-receiving recess 11 disposed rearwardly of this seat-mounting floor surface. Therefore, the rear door is opened, and then a cargo, which is equal in length to the intermediate-row seat 9, can be loaded on this flat surface.

In this condition, the spare tire 14 is received in the lower half portion 11c of the seat-receiving recess 11, and the seat 11 is received in this recess 11 in stacked relation thereto, as shown in FIG. 7.

Figure 8:
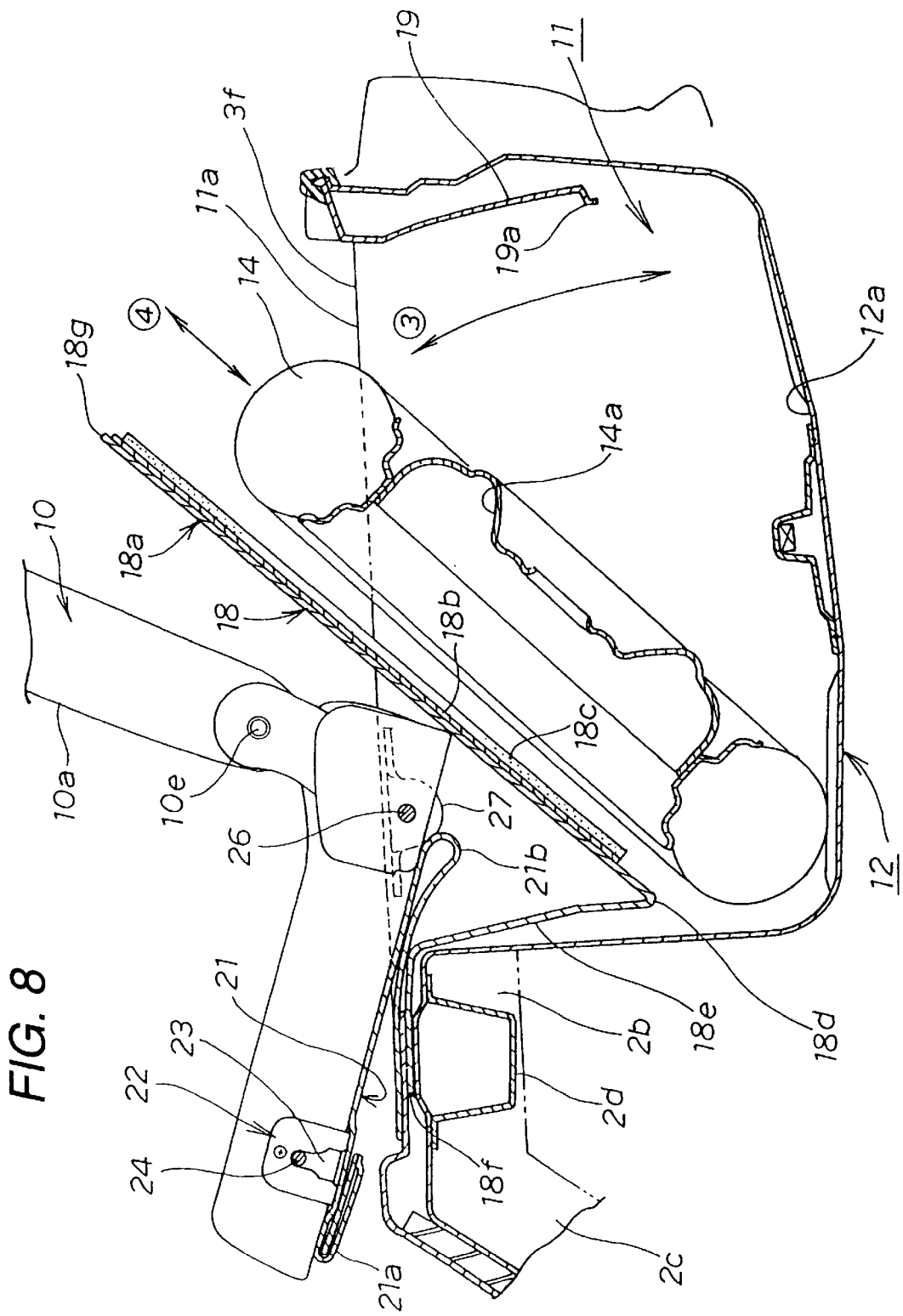
FIG. 8 is a view showing the manner of removing a spare tire from the seat-receiving recess.

FIG. 8 is a view showing the manner of removing the spare tire 14 from the seat-receiving recess 11.

The rear end 18g of the partition plate portion 18a of the partition sheet 18 is disengaged from the reception portion 19a formed at the lower end of the vertical wall member 19, and the partition sheet 18 is lifted upwardly as shown in FIG. 8, so that the partition sheet 18 is bent at the hinge portion 18d at the front end of the partition plate portion 18a.

Then, the spare tire 14 is disconnected from the fixing metal member 14b, and is grasped at its rear end portion, and is lifted into an inclined condition as indicated by arrow ③, and is withdrawn as indicated by arrow ④. For receiving the spare tire 14 in the receiving recess, operations, reverse to the operations indicated by arrows ③ and ④, are effected.

Although not shown in the drawings, a grip handle may be mounted on the upper surface of the rear end portion 18g so that the partition plate member 18a can be easily lifted.

The following effects can be achieved by the above construction of the present invention.

In the seat-receiving structure for a vehicle of the invention, the seats are mounted on the floor surface within the vehicle room, and are arranged in the forward-rearward direction, and the seat-receiving recess is formed in and extends downwardly from the floor surface disposed rearwardly of the rearmost-row seat, and the rearmost-row seat can be folded in such a manner that the seat back thereof is tilted down forwardly to be laid on the seat cushion thereof, and the folded seat can be turned rearwardly about rotation shafts to be received in the seat-receiving recess. The floor surface, in which the seat-receiving recess is formed, is disposed at a level higher than the foot-resting floor surface for the rearmost-row seat. The rotation shafts on the seat cushion of the rearmost-row seat are disposed at a level which is lower than the floor surface, in which the seat-receiving recess is formed, and also is lower than the upper side of the receiving recess.

In this construction, the floor surface, in which the seat-receiving recess is formed, is disposed at a level higher than the foot-resting floor surface for the rearmost-row seat, and therefore the depth of the seat-receiving recess can be made large.

Therefore, the size of the rearmost-row seat, including the thickness of each of the seat cushion and the seat back, can be increased, and there can be obtained the rearmost-row seat on which the passenger(s) can be seated comfortably though it is of the foldable, storable type.

It is only necessary that the floor surface, in which the seat-receiving recess is formed, should be disposed at the level higher than the foot-resting floor surface for the rearmost-row seat, and therefore the height of the vehicle will not increase, and besides the predetermined ground clearance can be secured while increasing the depth of the seat-receiving recess.

The rotation shafts on the seat cushion of the rearmost-row seat are disposed at a level which is lower than the floor surface, in which the seat-receiving recess is formed, and also is lower than the upper side of the receiving recess. Therefore, when the seat is tilted down rearwardly to be received in the seat-receiving recess, the brackets, supporting the rotation shafts, and other parts are received in the seat-receiving recess, and therefore there can be obtained the completely-flat cargo-placing floor surface, having no projection, at the rear portion of the vehicle room.

In the invention, the upper half portion of the seat-receiving recess serves as the receiving portion for receiving the rearmost-row seat while the lower half portion of the receiving recess serves as the receiving portion for receiving the spare tire.

In this construction, the seat and the spare tire can be received in a stacked manner in the receiving recess without increasing the vehicle height while securing the minimum ground clearance. And besides, the spare tire and the rearmost-row seat can be received in one receiving portion, and therefore the receiving structure for the two can be simplified.

In the invention, the right and left frames are provided below the floor of the vehicle, and are disposed at the right and left side portions of the floor, respectively, and the rear end portions of the right and left frames are offset outwardly in the direction of the width of the vehicle to provide the wide portions, respectively, and the seat-receiving recess is provided at a space between the wide portions.

In this construction, the seat-receiving recess is provided between the wide portions (rear end portions) of the right and left frames, and therefore the width of the receiving recess can be increased while securing the increased depth thereof, so that the capacity of the seat-receiving recess can be increased.

Therefore, the width of the rearmost-row seat can be increased, and there can be obtained the convenient rearmost-row seat on which the passenger(s) can be seated comfortably.

While only certain embodiments of the invention have been specifically described herein, it will apparent that numerous modifications may be made thereto without departing from the spirit and scope of the invention.

What is claimed is:

1. A seat-receiving structure for a vehicle wherein seats are mounted on a floor surface within a vehicle room in a forward-rearward direction of the vehicle,
   a seat-receiving recess portion is formed to dent downwardly from the floor surface disposed rearwardly of the rearmost-row seat,
   the rearmost-row seat is folded by tilting down forward a seat back to be laid on a seat cushion thereof, and the folded seat is turned rearward about rotation shafts mounted upon a bracket to thereby be received in the seat-receiving recess,
   the floor surface, in which the seat-receiving recess is formed, is disposed at a level higher than a foot-resting floor surface for the rearmost-row seat, and
   the rotation shafts and the bracket on the seat cushion on the rearmost-row seat are disposed at a level which is lower than the floor surface, in which the seat-receiving recess is formed, and also are lower than an upper side of the receiving recess.

2. The seat-receiving structure according to claim 1, in which an upper half portion of the seat-receiving recess defines a receiving portion for receiving the rearmost-row seat, and a lower half portion of the receiving recess defines a receiving portion for receiving a spare tire.

3. The seat-receiving structure according to claim 1, wherein right and left frames are disposed below a floor of a vehicle at right and left side portions of the floor, respectively, and wide portions spread outwardly in a direction of a width of the vehicle are respectively formed in rear end portions of the right and left frames, respectively, and the seat-receiving recess is provided at a space between the wide portions.

4. A seat-receiving structure for a vehicle comprising:
   a pair of side frames;
   a floor panel disposed between the side frames to define a floor surface including a first floor surface and a second floor surface disposed at a level higher than the first floor surface;
   a plurality of seats arranged on the floor surface in a longitudinal direction of the vehicle, the seats including a rearmost-row seat having:
      a seat cushion disposed on the second floor surface in such a manner as to rest feet of a passenger on the first floor surface;
      a foldable seat back tilting down forwardly with respect to the seat cushion; and
      a rotation shaft mounted upon a bracket is provided on side portions of the seat cushion so that the folded seat is turned rearwardly therearound; and
   a receiving recess portion disposed rearwardly of the rearmost-row seat and between the side frames in such a manner as to dent downwardly from the second floor surface,
   wherein the floor surface covering the receiving recess portion is disposed at the substantially same level as the second floor surface, and
   the rotation shaft and the bracket are disposed within and attached to the receiving recess portion at a level lower than the floor surface of the receiving recess portion.

5. The seat-receiving structure according to claim 4, wherein at least one of the seats is disposed on the first floor surface.

6. The seat-receiving structure according to claim 4, wherein the floor panel is integrally formed in such a manner as to connect the first floor surface with the second floor surface.

7. The seat-receiving structure according to claim 4, wherein the receiving recess portion includes a partition plate to partition an upper receiving recess portion for receiving the rearmost-row seat, and a lower receiving recess portion for receiving a spare tire.

8. The seat-receiving structure according to claim 4, wherein the rearmost-row seat further includes a mat connected to a back surface of the seat cushion and the second floor surface to define the floor surface of the receiving recess portion when the rearmost-row seat is received in the receiving recess portion.

9. The seat-receiving structure according to claim 4, wherein the rear end portions of the side frames respectively include wide portions spread outwardly in a direction of a width of the vehicle, and the receiving recess portion is provided at a space between the wide portions.

10. The seat-receiving structure according to claim 1, wherein a cross-member is disposed between a bending portion and a front surface of the receiving recess portion, the cross member being located at a position higher than the foot-resting floor surface for the rearmost row seat.

11. The seat-receiving structure according to claim 4, wherein a cross-member is disposed between a bending portion and a front surface of the receiving recess portion, the cross member being located at a position higher than the foot-resting floor surface for the rearmost row seat.

* * * * *